(12) United States Patent
Kim et al.

(10) Patent No.: US 8,092,933 B2
(45) Date of Patent: Jan. 10, 2012

(54) PORTABLE TERMINAL HAVING BATTERY COVER

(75) Inventors: Min-Soo Kim, Seoul (KR); Yoon-Young Cho, Seoul (KR); Chang-Soo Lee, Incheon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 512 days.

(21) Appl. No.: 11/947,436

(22) Filed: Nov. 29, 2007

(65) Prior Publication Data

US 2008/0226970 A1   Sep. 18, 2008

(30) Foreign Application Priority Data

Mar. 16, 2007   (KR) .................. 10-2007-0026097

(51) Int. Cl.
*H01M 2/10* (2006.01)
*H04M 1/00* (2006.01)
*H04B 1/03* (2006.01)
*H02J 7/00* (2006.01)

(52) U.S. Cl. .. 429/100; 429/99; 455/575.4; 379/433.08; 361/814; 320/114

(58) Field of Classification Search ............ 429/96–100, 429/122–347; 455/575.1–575.8; D14/138; 361/814; 320/114; 379/433.08
See application file for complete search history.

(56) References Cited

U.S. PATENT DOCUMENTS

| 5,783,327 | A  | * | 7/1998 | Mendolia ........................ 429/97 |
| 5,933,330 | A  | * | 8/1999 | Beutler et al. ................ 361/814 |
| 2002/0086647 | A1 | * | 7/2002 | Ilvonen .......................... 455/90 |
| 2006/0147794 | A1 | * | 7/2006 | Hakunti et al. ............... 429/100 |

FOREIGN PATENT DOCUMENTS

| JP | 09326849      | 12/1997 |
| JP | 2000036292    | 2/2000  |
| KR | 1020000069142 | 11/2000 |
| KR | 1020020049754 | 6/2002  |
| KR | 200381964     | 4/2005  |
| KR | 100651845     | 11/2006 |

OTHER PUBLICATIONS

Nokia, Nokia 3600 and Nokia 3650 User Guide, May 2003, Nokia.*
Leong, Photographic Evidence of Nokia 3600.*

* cited by examiner

*Primary Examiner* — Basia Ridley
*Assistant Examiner* — Jonathan G Leong
(74) *Attorney, Agent, or Firm* — H.C. Park & Associates, PLC

(57) ABSTRACT

The portable terminal includes a main body, a battery pack removably mounted to a back surface of the main body, and a battery cover mounted to the back surface of the main body. The battery cover is slidingly removable from the back surface of the main body and has a planar surface and an opening. When the battery cover is mounted to the main body, the battery cover receives the battery pack and a part of the main body is exposed through the opening.

13 Claims, 10 Drawing Sheets

PORTABLE TERMINAL HAVING BATTERY COVER

CROSS REFERENCE TO RELATED APPLICATION

This application claims priority from and the benefit of Korean Patent Application No. 10-2007-0026097, filed on Mar. 16, 2007, which is hereby incorporated by reference for all purposes as if fully set forth herein.

BACKGROUND OF THE INVENTION

1. Field of the Invention

The present invention relates to a portable terminal, and more particularly to a battery cover for a portable terminal.

2. Discussion of the Background

In general, portable terminals are communication devices that enable users to exchange communication signals with other users through wireless service providers. A user may use various services such as voice calling, text messaging, multimedia services, entertainment services, etc., provided by a portable terminal.

The portable terminals may be classified as bar-type terminals, flip-type terminals, and folder-type terminals depending on the body structure type of the terminal. The bar-type terminal has a single housing with a transmitter unit, a receiver unit, and data input/output devices, etc. The flip-type terminal has a single housing with a transmitter unit, a receiver unit, and data input/out devices, etc., like the bar-type terminal, and further includes a flip cover to cover or uncover the data input device, which may be a keypad. The folder-type terminal has a pair of housings that are foldable together and a transmitter unit, a receiver unit, and data input/output devices appropriately arranged on the two housings. Recently, terminals with various opening and closing styles, including sliding-type terminals, popup-type terminals, and swing-type terminals, have been commercialized in order to meet users' various preferences.

Referring to FIG. 10, a portable terminal 200 includes a battery 201 to supply electric power. The portable terminal 200 is supplied with electric power from the battery 201 and thus can perform functions such as voice calling, text message transmission/reception, etc. The battery 201 is typically mounted to a back surface 202 of the portable terminal 200. The back surface 202 of the portable terminal 200 has a parting line 211. The battery 201 makes up part of the appearance of the back surface 202 of the portable terminal 200. And with a larger capacity battery 201, the battery 201 protrudes from the back surface 202. Recently, design has been considered a significant issue in the development of the portable terminals and thus, the batteries are also designed and manufactured in consideration of the design of the portable terminals.

Portable terminals have become more and more compact and lightweight, and therefore, so have their batteries. The smaller the batteries, the smaller their capacity. That is, smaller batteries have shorter discharge duration times. To solve this problem, as shown in FIG. 10, a terminal 200 may be provided with a larger capacity battery 201. However, since a larger capacity battery has a thicker profile, the battery 201 may protrude from the back surface 202 of the terminal 200. In addition, since the battery 201 of the portable terminal 200 may be removable, the parting line 211 between the terminal 200 and the battery 201 may result in a bad terminal design.

SUMMARY OF THE INVENTION

The present invention provides a portable terminal which may have a good design regardless of components such as battery, etc.

Also, the present invention provides a portable terminal that may have a longer use or standby time.

Additional features of the invention will be set forth in the description which follows, and in part will be apparent from the description, or may be learned by practice of the invention.

The present invention discloses a portable terminal including a main body, a battery pack removably mounted to a back surface of the main body, a battery cover mounted to the back surface of the main body, the battery cover being slidingly removable from the back surface of the main body and having a planar surface and an opening. When the battery cover is mounted to the main body, the battery cover receives the battery pack and a part of the main body is exposed through the opening.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
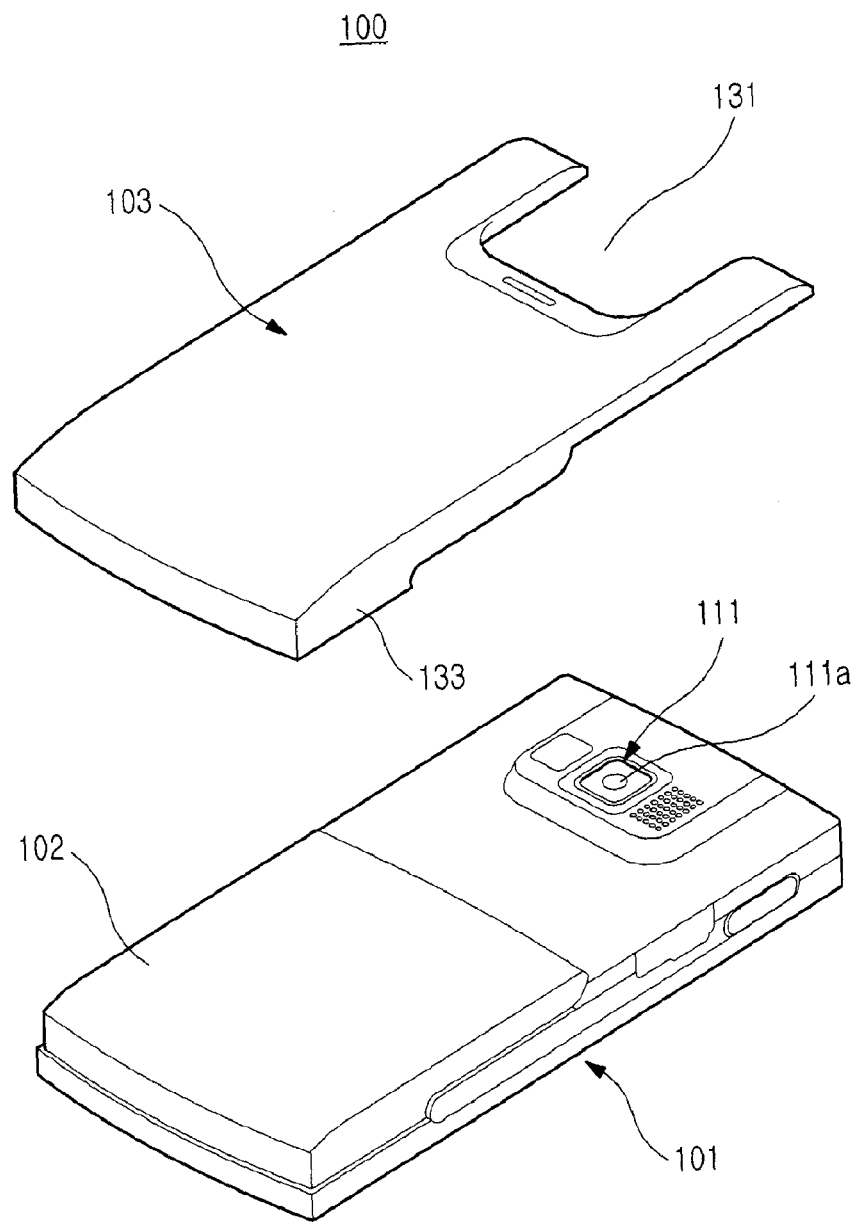
FIG. 1 is an exploded perspective view of a portable terminal according to a first exemplary embodiment of the present invention.
Figure 2:
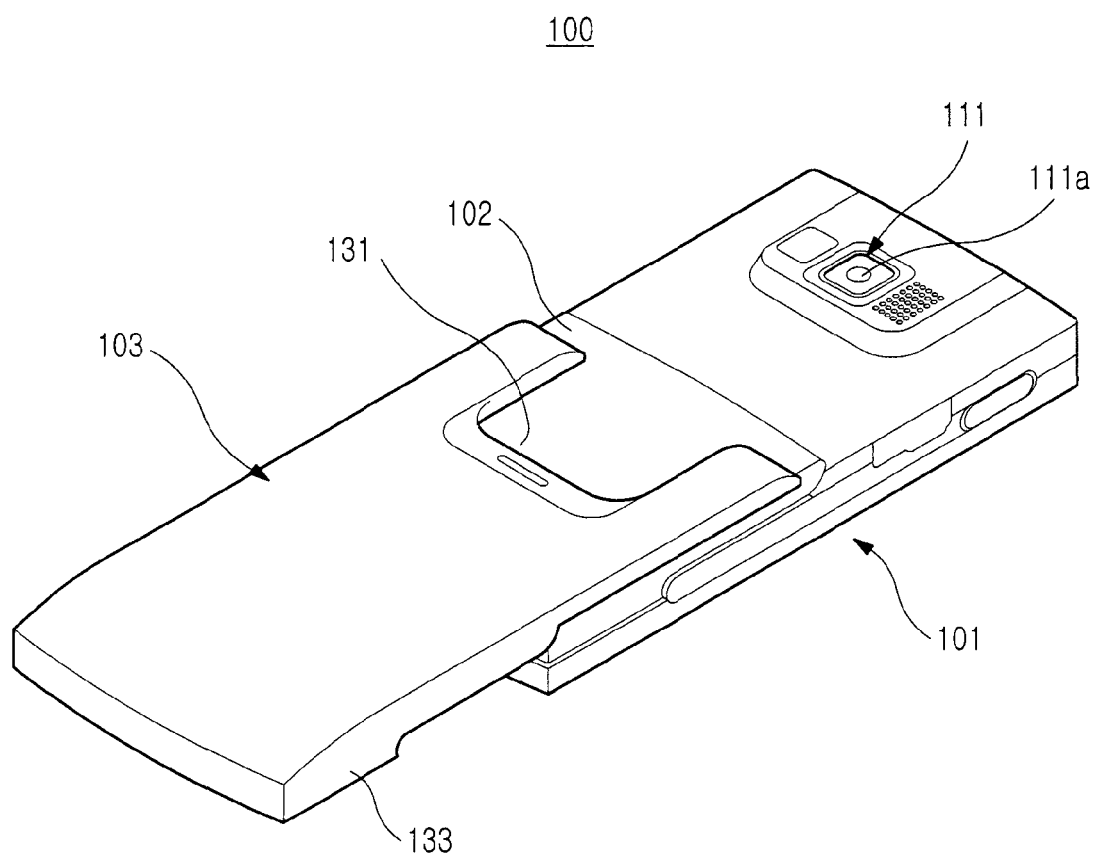
FIG. 2 is a perspective view of the portable terminal shown in FIG. 1 that shows a sliding movement of a battery cover of the portable terminal.
Figure 3:
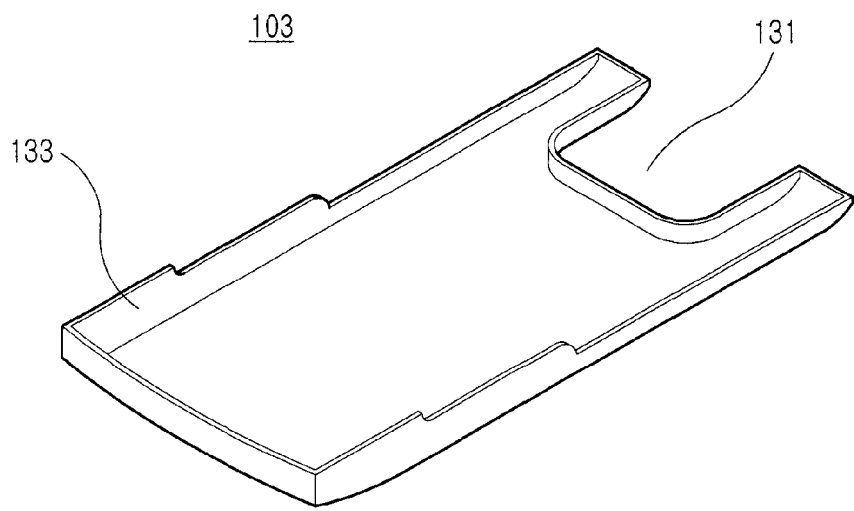
FIG. 3 is a perspective view of the battery cover shown in FIG. 2.
Figure 4:
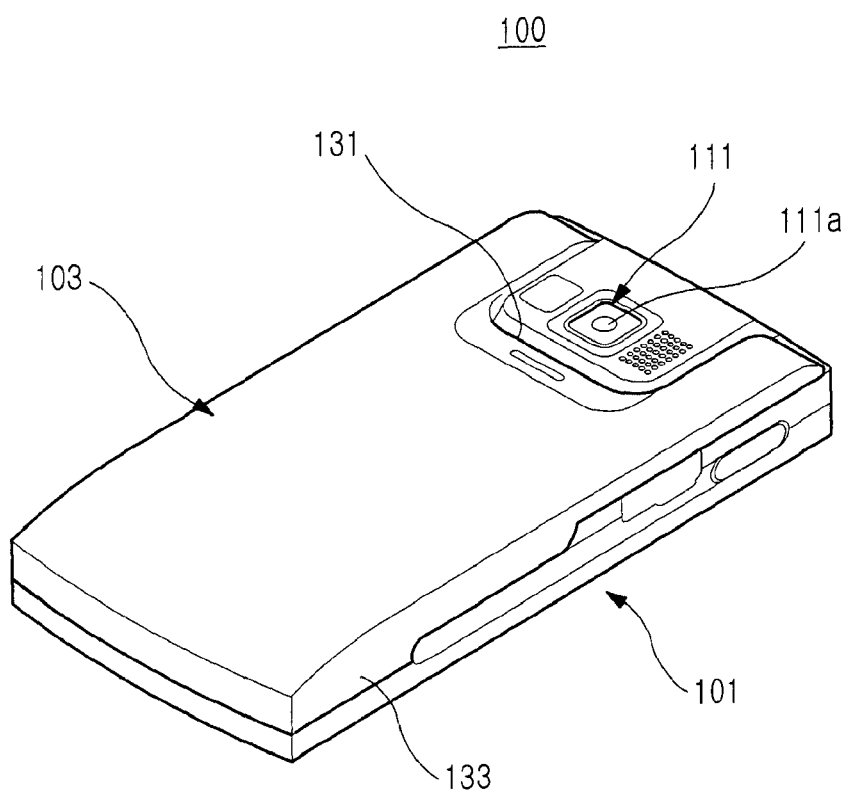
FIG. 4 is a perspective view of the portable terminal shown in FIG. 1, in which the battery cover is mounted to the portable terminal.
Figure 5:
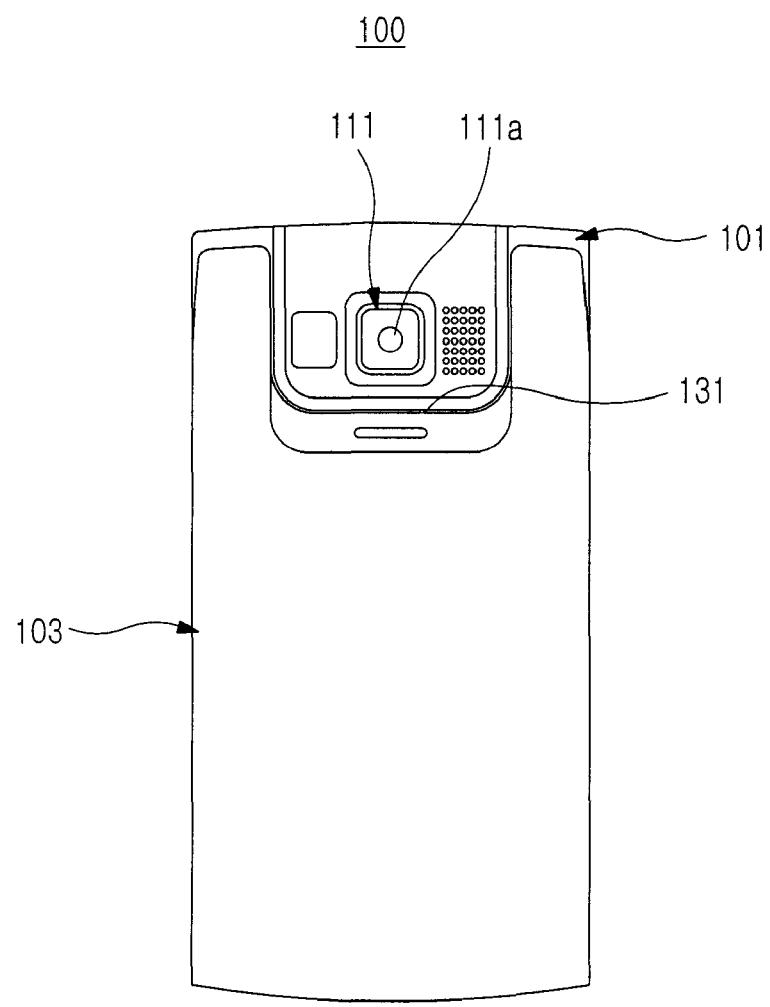
FIG. 5 is a plan view of the portable terminal shown in FIG. 4.
Figure 6:
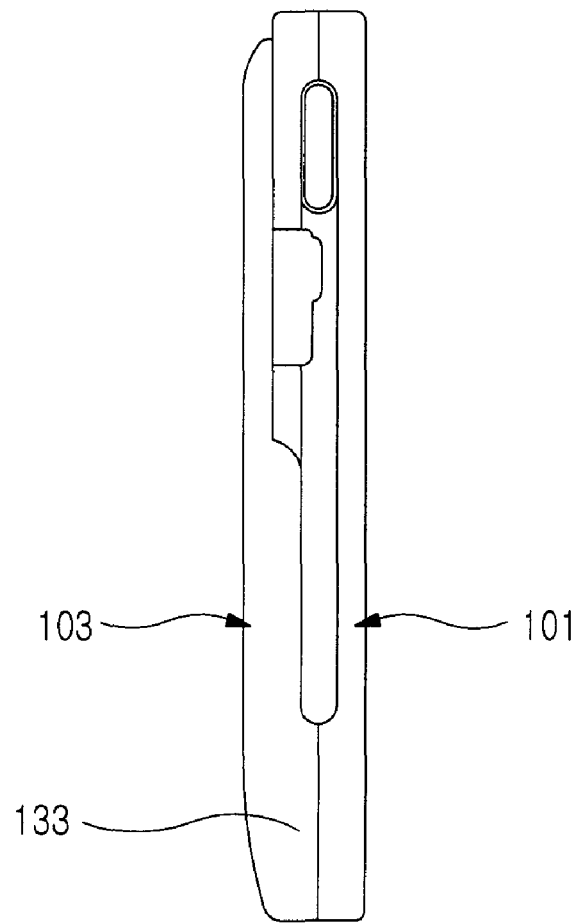
FIG. 6 is a left side view of the portable terminal shown in FIG. 4.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

Referring to FIG. 1, FIG. 2, FIG. 3, FIG. 4, FIG. 5, and FIG. 6, a portable terminal 100 according to a first exemplary embodiment of the present invention includes a main body 101, a battery pack 102, and a battery cover 103.

A display unit and a keypad are, though not shown in drawings, arranged on a front surface of the main body 101. The display unit and the keypad are used as an output device and an input device, respectively. Users may perform functions using the portable terminal 100, such as voice calling, text message transmission/reception, multimedia contents downloading, file play back, etc. In addition, the main body 101 has a mounting unit 111 protruding from a back surface thereof. A camera lens 111a is arranged in the mounting unit 111. The camera lens 111a may be exposed on the back surface of the main body 101. The display unit displays photographic images of subjects. Thus, the user may use the camera lens 111a while monitoring photographic images of subjects through the display unit.

The battery pack 102 is removably mounted at a lower portion of the back surface of the main body 101. The battery pack 102 supplies the main body 101 with electric power to enable the main body 101 to operate when the battery pack 102 is mounted at the lower portion of the back surface of the main body 101.

The battery cover 103 may have a flat planar surface. The battery cover 103 may be mounted to and removable from the main body 101 by sliding along the back surface of the main body 101. The battery cover 103 has an open end and a closed end. Therefore, the battery cover 103 may be mounted to the main body 101 such that the battery cover 103 slides from one end of the battery cover 103 to the other end. The battery cover 103 may receive the battery pack 102 and cover the back surface of the main body 101 when it is mounted to the main body 101. At this time, the main body 101 may be closely fitted in the other end portion of the battery cover 103, thereby keeping the back surface of the main body 101 covered with the battery cover 103.

An opening 131 is formed by cutting out a portion of one end of the battery cover 103. The opening 131 also slides when the battery cover 103 slides on the back surface of the main body 101. Here, the mounting unit 111 may be received in or released from the opening 131.

In addition, the mounting unit 111 may be exposed through the opening 131 while the battery cover 103 is covering the back surface of the main body 101. That is, though the back surface of the main body 101 is covered by the battery cover 103, the opening 131 may expose the mounting unit 111 to the outside. Thus, the camera lens 111a arranged in the mounting unit 111 may remain available. Instead of the camera lens 111a, a device like a speaker or a game controller etc. may be arranged in the mounting unit 111.

In addition, the battery cover 103, and specifically the edge of the opening 131 is prevented from interfering with the mounting unit 111 is restricted in its movement so that it does not cover the mounting unit 111.

Guide portions 133 extend from ends of both sides of the battery cover 103, respectively, and face each other. When the battery cover 103 slides on the back surface of the main body 101, the guide portions 133 surround and are engaged with both side surfaces of the main body 101 and guide the sliding movement of the battery cover 103. In addition, the battery pack 102 is positioned between the guide portions 133 when the battery cover 103 slides on the back surface of the main body 101. Thus, when the battery cover 103 is mounted to the main body 101 and covering the back surface of the main body 101, the battery pack 102 may be received in the battery cover 103. At this time, the battery pack 102 may be received in the battery cover 103 as long as the battery pack 102 does not interfere with the battery cover 103 within the range of thickness of the pack. As a result, the battery cover 103 makes the back surface of the portable terminal 100 flat and planar, even though the battery pack 102 mounted to the main body 101 protrudes from the back surface thereof.

This exemplary embodiment shows an example in which the battery pack 102 and the battery cover 103 are separated from each other. The battery pack 102 and the battery cover 103 are sequentially mounted on the back surface of the main body 101. Therefore, the back surface of the main body 101 is covered by the battery cover 103 while it is being operated by electric power supplied from the battery pack 102. It is also possible, though not shown in detail, that the battery pack 102 be mounted to the battery cover 103. In this case, when the battery cover 103 slides on the back surface of the main body 101 and then is mounted to the main body 101 so as to cover the back surface of the main body 101, the battery pack 102 may be mounted to the back surface of the main body 101. That is, the battery pack 102 and the battery cover 103 may be mounted to the main body 101 at the same time.

Figure 7:
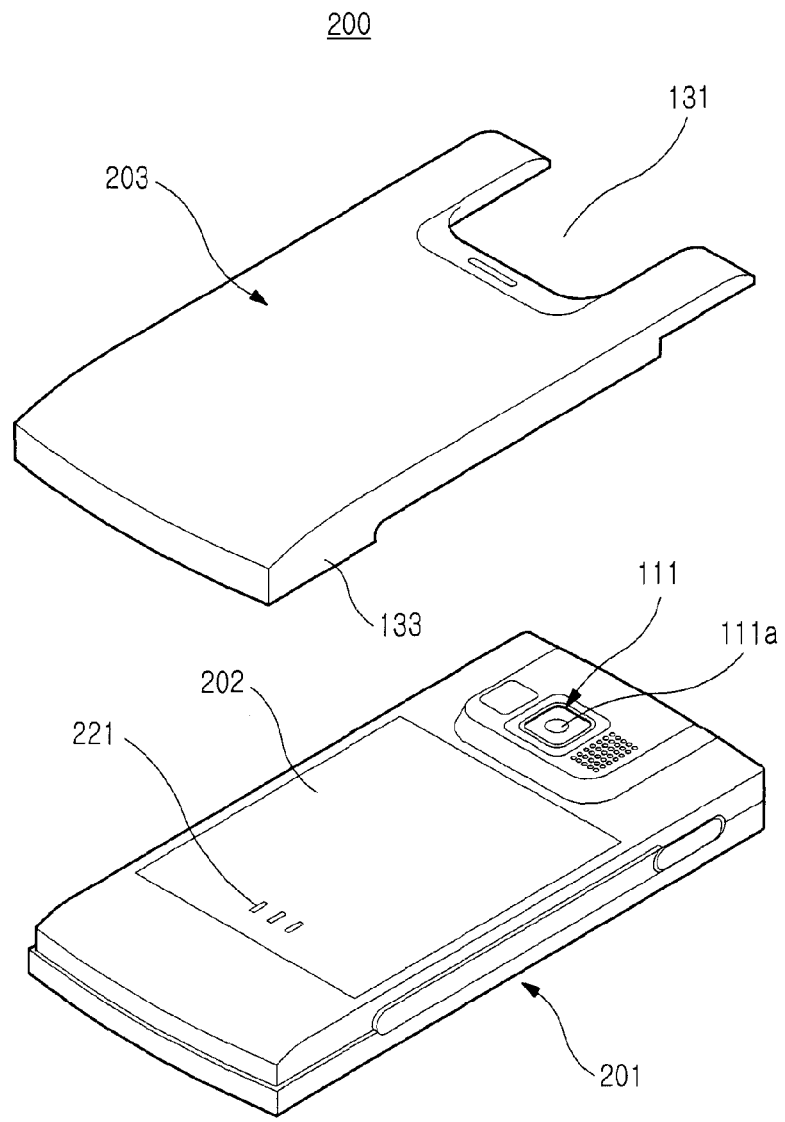
FIG. 7 is an exploded perspective view of a portable terminal according to a second exemplary embodiment of the present invention.
Figure 8:
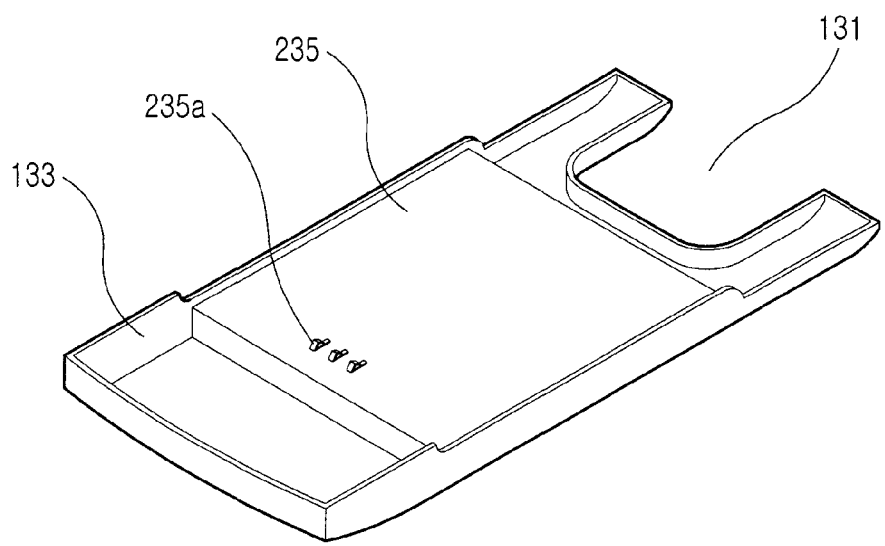
FIG. 8 is a perspective view of the battery cover of the portable terminal shown in FIG. 7.
Figure 9:
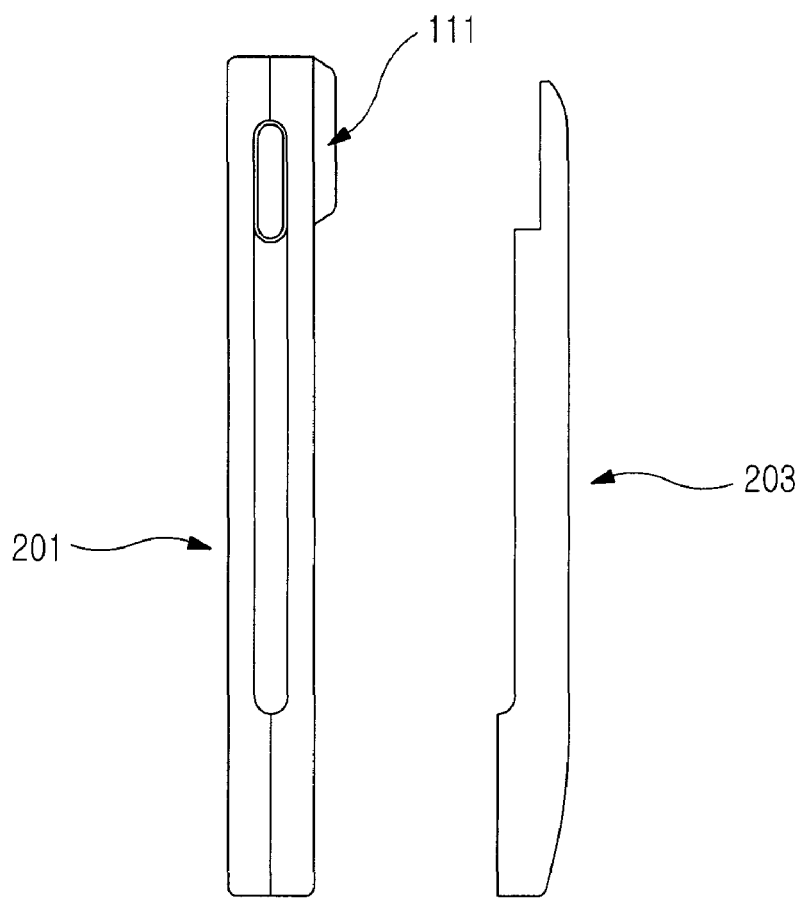
FIG. 9 is a right side view of the portable terminal shown in FIG. 7, in which the battery cover is separated from the portable terminal.
Figure 10:
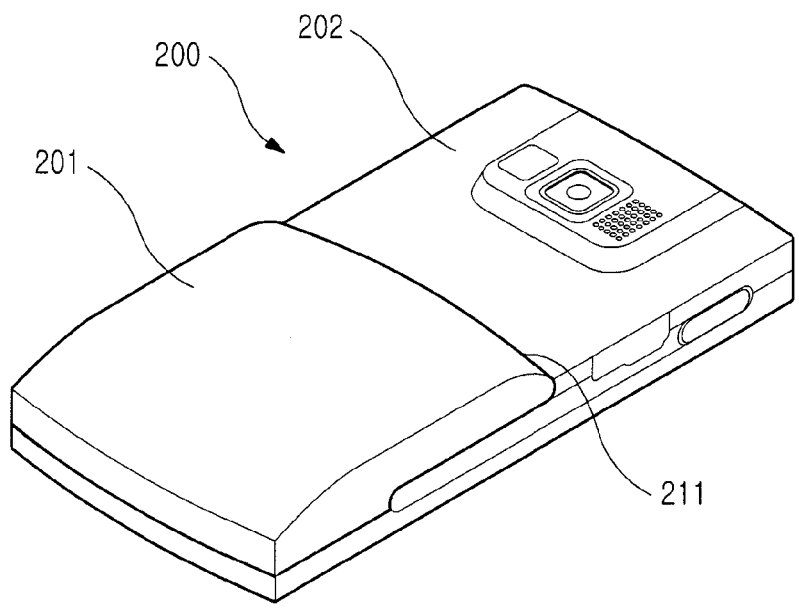
FIG. 10 is an exploded perspective view of a portable terminal according to a prior art.

Referring to FIG. 7, FIG. 8, and FIG. 9, a portable terminal 200 according to a second exemplary embodiment of the present invention includes, like the first exemplary embodiment, a main body 201, a battery pack 202, and a battery cover 203. In this exemplary embodiment, like the first exemplary embodiment, the battery cover 203 slides on the back surface of the main body 201 so as to be mounted to the main body 201 and cover the back surface of the main body 201. At the same time, the battery pack 202 may be received in the battery cover 203. However, the portable terminal 200 according to this exemplary embodiment differs from the first exemplary embodiment in that a cover battery pack 235 may be mounted to the battery cover 203 and the back surface of the main body 201 mounting the battery pack 202 may be covered by the battery cover 203 on which the cover battery pack 235 is mounted.

That is, in the portable terminal 100 disclosed in the first exemplary embodiment, the back surface of the main body 101 may be covered by the battery cover 103 and the battery pack 102 may be received in the battery cover 103. Therefore, in order to mount a larger capacity battery, the battery pack may need to be exchanged. To the contrary, in the portable terminal 200 according to this exemplary embodiment, the back surface of the main body 201 may be covered by the battery cover 203 on which the cover battery pack 235 is mounted and the cover battery pack 235 may be received in the battery cover 203. In addition, the battery pack 202 may have connection terminals 221 formed therein and the cover battery pack 235 may have cover connection terminals 235a formed therein. Thus, when the battery cover 203 covers the back surface of the main body 201, the cover connection terminals 235a may be interconnected with the connection terminals 221, thereby providing the main body 201 with electric power from the cover battery pack 235 via the battery pack 202. Therefore, the portable terminal 200 according to this exemplary embodiment may be supplied with electric power from the battery pack 202 mounted therein and may also be supplied with electric power as much as a capacity of the cover battery pack 235 because the cover connection terminals 235a are interconnected with the connection terminals 221 at the time that the back surface of the main body 201 to which the battery pack 202 is mounted is covered by the battery cover 203.

As described above, the portable terminal according to exemplary embodiments of the present invention includes a main body, a battery pack, and a battery cover, and therefore, the back surface of the main body, on which the battery pack is mounted, may be covered by the battery cover in such a manner that the battery cover slides on the back surface of the main body. As a result, a larger capacity battery mounted to the back surface of the main body may not protrude from the main body. Also, the battery cover may cover the parting line, etc., in the back surface of the main body so as not to be exposed. In addition, the opening formed in the battery cover may expose the components protruding from the back surface of the main body therethrough so that the components may be used even when the battery cover covers the back surface of the main body. Consequently, according to exemplary embodiments of the present invention, since the elements that may spoil the appearance of the portable terminal are covered by the battery cover while the necessary components are mounted to the back surface of the main body, the design of the portable terminal may be improved.

In addition, since the battery cover may not only cover a larger capacity battery protruding from the back surface of the portable terminal, but also may provide the portable terminal with an additional cover battery pack, it may provide a longer use time for the portable terminal.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A portable terminal, comprising:
a main body;
a battery pack removably mounted to a first portion of a back surface of the main body; and
a battery cover slidably mounted to the back surface of the main body and comprising a planar surface and an opening, the planar surface covering the battery pack and a second portion of the back surface of the main body, the second portion being a different portion of the back surface from the first portion,
wherein the battery cover is slidingly removable from the back surface of the main body,
wherein the battery pack is mounted to a surface of the battery cover such that the battery pack slides with the battery cover,
wherein a part of the main body is exposed through the opening, and
when the battery pack is mounted to the back surface of the main body, a back surface of the battery pack is coplanar with the second portion of the back surface of the main body, and
when the battery cover is mounted to the back surface of the main body, the battery cover faces the back surface of the battery pack and the back surface of the main body.

2. The portable terminal of claim 1, further comprising a mounting unit protruding from the back surface of the main body,
wherein the mounting unit is exposed through the opening when the battery cover is mounted to the main body.

3. The portable terminal of claim 2, wherein an edge of the opening stops the battery cover from covering the mounting unit by engaging mounting unit.

4. The portable terminal of claim 2, wherein the mounting unit is received in or released from the opening when the battery cover slides on the back surface of the main body.

5. The portable terminal of claim 1, wherein the battery cover further comprises an open end and a closed end, and the battery cover slides from one end to the other end of the battery cover on the back surface of the main body so as to cover the back surface of the main body, the opening being arranged at the open end.

6. The portable terminal of claim 5, wherein the closed end of the battery cover is fitted to the back surface of the main body when the battery cover is mounted to the main body, thereby covering the back surface of the main body.

7. The portable terminal of claim 1, wherein the battery cover further comprises guide portions extending from both sides thereof, the guide portions facing each other,
wherein the guide portions respectively engage with side surfaces of the main body and guide the sliding movement of the battery cover.

8. The portable terminal of claim 1, wherein the battery cover comprises guide portions extending from both sides thereof, the guide portions facing each other; and
wherein the guide portions guide the sliding movement of the battery cover, and the battery pack is mounted to the main body when the battery cover is mounted to the main body.

9. The portable terminal of claim 1, wherein the second portion covers the back surface of the main body from a first side edge to a second side edge, the back surface of the main body meeting side surfaces of the main body at the side edges.

10. The portable terminal of claim 9, wherein the battery cover further comprises guide portions extending from both sides thereof, the guide portions facing each other,
wherein the guide portions respectively engage with the side surfaces of the main body and guide the sliding movement of the battery cover, and the side surfaces of the main body are not on the back surface of the main body.

11. The portable terminal of claim 5, wherein the closed end of the battery cover engages an end surface of the main body when fitted to the back surface of the main body and the battery cover is mounted to the main body, thereby covering the back surface of the main body and a portion of the end surface,
wherein the end surface of the main body meets the back surface of the main body at an end edge.

12. The portable terminal comprising:
a main body;
battery pack removably mounted to a back surface of the main body;
a battery cover mounted to the back surface of the main body and comprising a planar surface and an opening; and
a cover battery pack integrally formed to the batter cover,
wherein the battery cover is slidingly removable from the back surface of the main body,
wherein the battery cover covers the battery pack and the cover battery pack such that the battery cover forms an outermost surface of the portable terminal,
wherein a part of the main body is exposed through the opening, and
wherein the cover battery pack slides on the battery pack when the battery cover slides on the back surface of the main body.

13. The portable terminal of claim 12, further comprising:
connection terminals disposed on the battery pack; and
cover connection terminals disposed on the cover battery pack,
wherein when the battery cover is mounted to the main body, the cover connection terminals are connected to the connection terminals.

* * * * *